United States Patent [19]
Shochet

[11] Patent Number: 6,108,007
[45] Date of Patent: Aug. 22, 2000

[54] METHOD, SYSTEM, AND COMPUTER PROGRAM PRODUCT FOR INCREASING INTERPOLATION PRECISION USING MULTI-CHANNEL TEXTURE MAPPING

[75] Inventor: Ofer Shochet, Tel-Aviv, Israel

[73] Assignee: Silicon Graphics, Inc., Mountain View, Calif.

[21] Appl. No.: 08/948,026

[22] Filed: Oct. 9, 1997

[51] Int. Cl.[7] .................................................. G06T 11/40
[52] U.S. Cl. ............................................ 345/430; 345/431
[58] Field of Search .................................... 345/421, 425, 345/426, 430, 513, 503, 431

[56] References Cited

U.S. PATENT DOCUMENTS

| | | | |
|---|---|---|---|
| 4,216,526 | 8/1980 | Karwowski | 364/414 |
| 4,222,104 | 9/1980 | Moore | 364/414 |
| 4,223,384 | 9/1980 | Hounsfield et al. | 364/414 |
| 4,250,387 | 2/1981 | Hounsfield et al. | 250/445 |
| 4,398,251 | 8/1983 | LeMay | 364/414 |
| 4,639,941 | 1/1987 | Hounsfield | 378/11 |
| 4,843,618 | 6/1989 | Best et al. | 378/4 |
| 5,710,876 | 1/1998 | Peercy et al. | 345/426 |
| 5,734,874 | 3/1998 | Van Hook et al. | 345/513 |
| 5,896,136 | 4/1999 | Augustine et al. | 345/431 |

FOREIGN PATENT DOCUMENTS

| | | | |
|---|---|---|---|
| 0680013A3 | 4/1997 | European Pat. Off. | G06T 1/20 |

OTHER PUBLICATIONS

Foley, *Computer Graphics*, Addison–Wesley Publishing, 1996, pp. xvii–xxiii and 855–922.

Cabral et al., "Accelerated Volume Rendering and Tomograghic Reconstruction Using Texture Mapping Hardware". *Proceedings of ACM/IEEE Symposium on Volume Visualization* (IEEE CS Press), 1994, pp. 91–98.

Drebin et al., "Volume Rendering", *Computer Graphics*, vol. 22, No. 4, Aug. 1988, pp. 65–74.

Azevedo, Stephen G., Brian K. Cabral and James Foran, *Silicon Graphics Computer Systems*, "Tomographic image reconstruction and rendering with texture–mapping hardware", SPIE vol. 229, pp. 280–291.

*Primary Examiner*—Mark K. Zimmerman
*Assistant Examiner*—Kimbinh T. Nguyen
*Attorney, Agent, or Firm*—Sterne, Kessler, Goldstein & Fox P.L.L.C.

[57] ABSTRACT

A method, system, and computer program product are provided for increasing interpolation bit precision using multi-channel texture mapping. According to the present invention, pixels are separated into respective groups of data segments in multiple texture channels. The groups of data segments in each texture channel are interpolated in parallel to obtain an interpolated pixel value for each texture channel. The interpolated pixel value for each texture channel for a sample is stored in a frame buffer. An accumulation operation, such as, blending, is used to accumulate interpolated pixel values for each texture channel for a number of samples in the frame buffer. In one example, interpolation according to the present invention is used in computer tomography and volume rendering using texture mapping. In another example of the present invention, interpolation is used in computer graphics processing using texture mapping. High-precision pixels having a number of bits greater than a precision bit threshold of the limited-precision graphics hardware can be interpolated (resampled and accumulated) using multi-channel texture mapping provided in limited-precision graphics hardware.

20 Claims, 5 Drawing Sheets

METHOD, SYSTEM, AND COMPUTER PROGRAM PRODUCT FOR INCREASING INTERPOLATION PRECISION USING MULTI-CHANNEL TEXTURE MAPPING

BACKGROUND OF THE INVENTION

1. Field of the Invention

The present invention relates to computer data processing and graphics.

2. Related Art

Many current multi-channel graphics cards (hereafter referred to as "limited-precision" graphics cards or hardware) cannot resample and accumulate high-precision data. Precision is limited in multi-channel graphics cards for two main reasons. First, texture mapping hardware may not support interpolation of data greater than a precision bit threshold, e.g. twelve bits. Second, an accumulation buffer may not be available. For example, an Impact™ computer made by Silicon Graphics, Inc. has a limited-precision graphics card. The Impact™ computer supports up to four 12-bit channels of texture data in texture random access memory (12/12/12/12 for 4 TRAM and 4/4/4/4 or 8/8 for 1 TRAM). The frame buffer can be configured to hold eight-bit red, green, blue, and alpha texture channels (RGBA 8/8/8/8) or 12-bit red, green, and blue texture channels (RGB 12/12/12). Impact™ graphics hardware generally has no hardware accumulation buffer.

Precision limitations in graphics hardware are especially constraining in medical applications, such as, computer tomography (CT). For example, Cabral et al. recently introduced the use of hardware texture mapping for fast back-projection. See, B. Cabral, N. Cam and J. Foran, "Accelerated Volume Rendering and Tomographic Reconstruction Using Texture Mapping Hardware," *Proceedings of ACM/IEEE Symposium on Volume Visualization* (IEEE CS Press), pp.91–98, 1994 (Order No. PR07067, 1995) (incorporated in its entirety herein by reference); and the co-pending, commonly-owned U.S. patent application by B. Cabral and J. Foran, "A System and Method of Performing Tomographic Reconstruction and Volume Rendering Using Texture Mapping," filed Jul. 7, 1995, application Ser. No. 08/499,614 (SGI Ref. No. 15-4-148.00, SKGF Ref. No. 1452.0420000) (incorporated in its entirety herein by reference).

A back-projection algorithm is used to reconstruct a CT image out of its projected sinograms. Each pixel in a final reconstructed CT image is reconstructed as the sum of contributions of all sinogram images. The value of each pixel is a sum over all sinograms. Medical CT data is often provided in a 16 bit LUMINANCE channel.

According to the Cabral and Foran fast back-projection technique, for each pixel and sinogram, an appropriate projection point is found. The distance from the appropriate projection point to its neighboring lattice points (x and 1−x) is calculated. Linear interpolation is then used to determine a value at non-lattice point on the sinogram. Finally, the interpolated values are accumulated. In a sense, a sinogram is "smeared" over the screen and accumulated using an accumulation buffer or blending.

The Cabral and Foran technique demonstrates that the speed of back-projection (without filtering) for an N×N image and M sinograms of arbitrary length is proportional to N×N×M/(Texture-fill-rate). For example, performing the algorithm for a 512×512 image with 512 sinograms on the high-precision Reality-Engine2™ whose texture fill rate is 80 Mpixels/sec will take theoretically 1.6 sec. Thus, this method is very promising as fast texture mapping capabilities have migrated to desk-top computers. However, even as texture mapping speed increases, desktop computers are often limited-precision machines employing limited-precision graphics cards or hardware as described above. The texture mapping capability of a desktop computer and any other limited-precision graphics computer is thus limited and cannot support a high-precision algorithm such as the Cabral and Foran fast back-projection technique.

Precision limits of a graphics card or hardware need to be overcome. A method, system, and computer program product is needed that allows calculations requiring high-bit precision to be run on limited-precision graphics cards or hardware. High-precision data, such as 16-bit luminance data used in computer tomography, needs to be resampled and accumulated by limited-precision graphics hardware and machines. Fast back-projection as in the Cabral and Foran technique for CT reconstruction and volume rendering needs to be supported by a limited-precision graphics hardware or card, including a desktop computer.

SUMMARY OF THE INVENTION

A method, system, and computer program product are provided for increasing interpolation bit precision using multi-channel texture mapping. According to the present invention, pixels are separated into respective groups of data segments in multiple texture channels. The groups of data segments in each texture channel are interpolated in parallel to obtain an interpolated pixel value for each texture channel, The interpolated pixel value for each texture channel for a sample is stored in a frame buffer. An accumulation operation, such as, blending, is used to accumulate interpolated pixel values for each texture channel for a number of samples in the frame buffer.

In one embodiment, a separator unit separates a first pixel into a first group of data segments in multiple texture channels and separates a second pixel into a second group of data segments in multiple texture channels. A texture engine includes an interpolator unit and an accumulator. An interpolator unit interpolates the first and second groups of data segments in each texture channel to obtain an interpolated pixel value for each texture channel. A frame buffer stores the interpolated pixel value for each texture channel for a sample. An accumulator sums interpolated pixel values for each texture channel for a number of samples such that the frame buffer stores a cumulative value of the interpolated pixel values for each texture channel for the samples. In one example, the accumulator includes a blend unit that performs a blend operation to blend interpolated pixel values for each texture channel for the number of samples.

In one preferred example, interpolation according to the present invention is used in computer tomography and volume rendering using texture mapping. Data comprises a sinogram sample of an image. The sinogram sample consists of a single channel of luminance grey-scale data in 16-bit data blocks (or pixels). First and second pixels undergoing bi-linear interpolation each comprise 16-bit data blocks having first to fourth four-bit data segments. The frame buffer stores 12-bit data segments in red, green, blue, and/or alpha texture channels. In one example, first and second data segments of a pixel are passed into a red texture channel. A third data segment of a pixel is passed into a green texture channel and a fourth data segment of a pixel is passed into a blue texture channel.

Interpolation according to the present invention is used in computer graphics processing using texture mapping. Data comprises any graphics data sample of an image.

In another embodiment of the present invention, a sample consists of a single channel of luminance grey-scale data in 12-bit data blocks (or pixels). First and second pixels undergoing bi-linear interpolation each comprise 12-bit data blocks having first to third four-bit data segments. The frame buffer stores 8-bit data segments in red, green, blue, luminance and/or alpha texture channels.

In one example of the present invention, first and second data segments of each pixel being interpolated are passed into an eight-bit word in a luminance texture channel. Second and third data segments of each pixel being interpolated are passed into an eight-bit word in an alpha texture channel. In the luminance channel, the first and second data segments are interpolated to obtain an eight-bit word including a four-bit data segment comprising the four least significant bits. In the alpha channel, the second and third data segments in each pixel are interpolated to obtain an eight-bit word having two four-bit data segments comprising respectively the four MSBs and four LSBs of the eight-bit word. The three four-bit segments of the luminance and alpha channels are then reordered and combined to form a 12-bit result. Further accumulation of remaining data can be performed to accumulate data over a number of samples. In another example, first and second data segments of each pixel are passed into a red texture channel. A third data segment of each pixel is passed into a green texture channel.

Thus, interpolation can be performed in resampling and accumulation operations with increased precision using multi-channel texture mapping provided in limited-precision graphics hardware. According to the present invention, high-precision pixels having a number of bits greater than a precision bit threshold of the limited-precision graphics hardware can be interpolated (resampled and accumulated) using multi-channel texture mapping provided in limited-precision graphics hardware.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
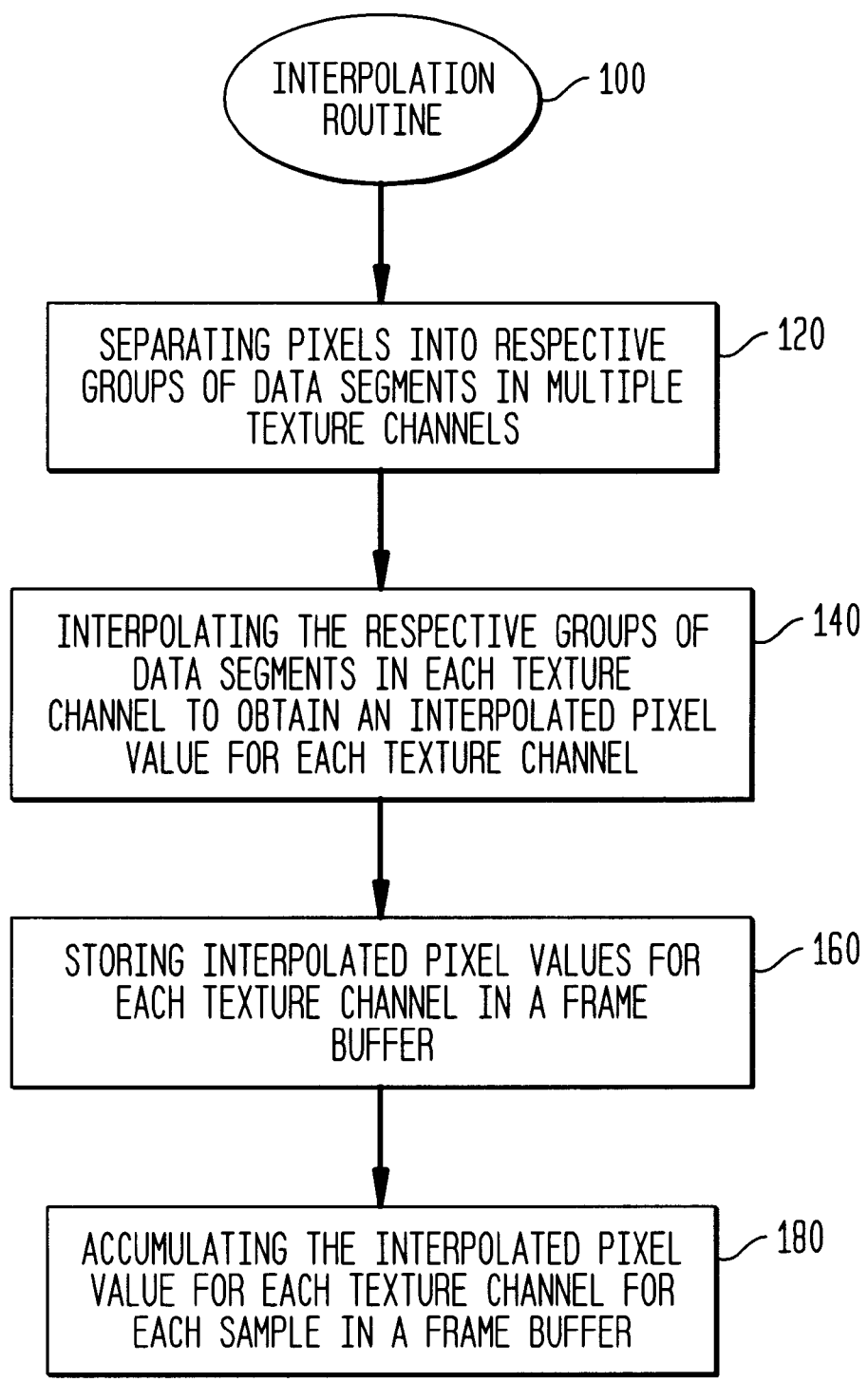
FIG. 1 is a flowchart of an interpolation routine according to one embodiment of the present invention.

The present invention is described with reference to the accompanying drawings. An effort is made to adhere to the following convention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention allows high precision data to be interpolated using a limited precision multi-channel texture engine. "Limited precision multi-channel texture engine" refers to any graphics computer system having multiple texture channels in which an interpolation operation can be performed on data up to a bit precision threshold. "High precision" data or data word refers to any data having a number of bits greater than a bit precision threshold of the limited precision multi-channel texture engine. The term "pixel" as used herein with respect to interpolation can include, but is not limited to, pixels of an original image, or elements of texture often called texels.

FIG. 1 shows an interpolation routine 100 for interpolating pixels of a sample according to one embodiment of the present invention. Pixels are first separated into respective groups of data segments in multiple texture channels (step 120). Any type and number of texture channels supporting interpolation can be used, such as red, green, blue, and/or alpha texture channels. Interpolation is then performed between the respective groups of data segments in each texture channel (step 140). In this way, an interpolated pixel value is obtained separately for each texture channel. The interpolated pixel value for each texture channel can then be stored in a frame buffer (step 160).

In practice, a number of samples are accumulated. Steps 120 and 140 are then repeated for all samples. Interpolated pixel values for each texture channel are accumulated in the frame buffer (step 180). Any accumulation operation can be performed including, but not limited to, a blending operation.

Figure 2A:
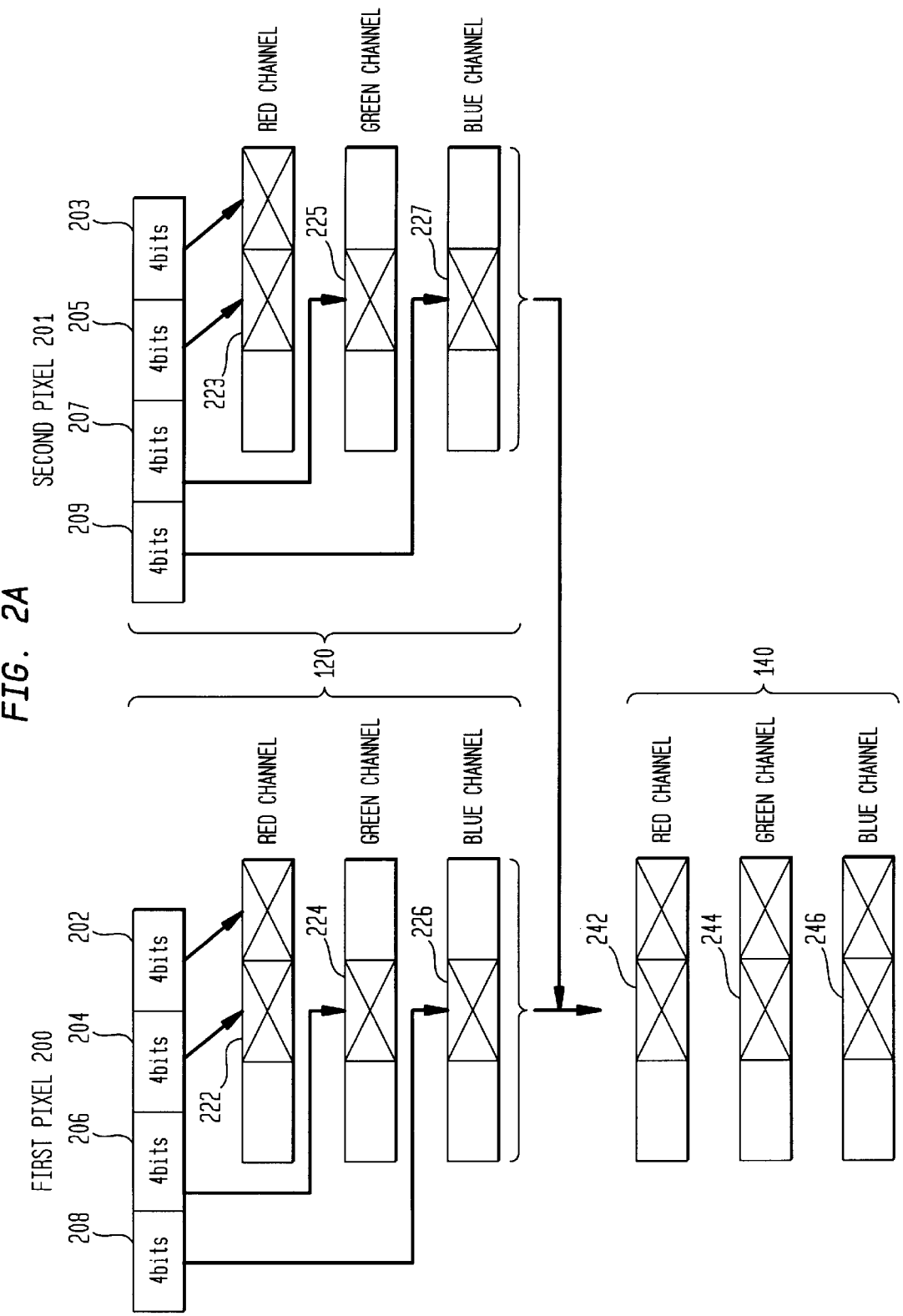
FIGS. 2A and 2B are schematic diagrams of an example interpolation operation according to the present invention.
Figure 2B:
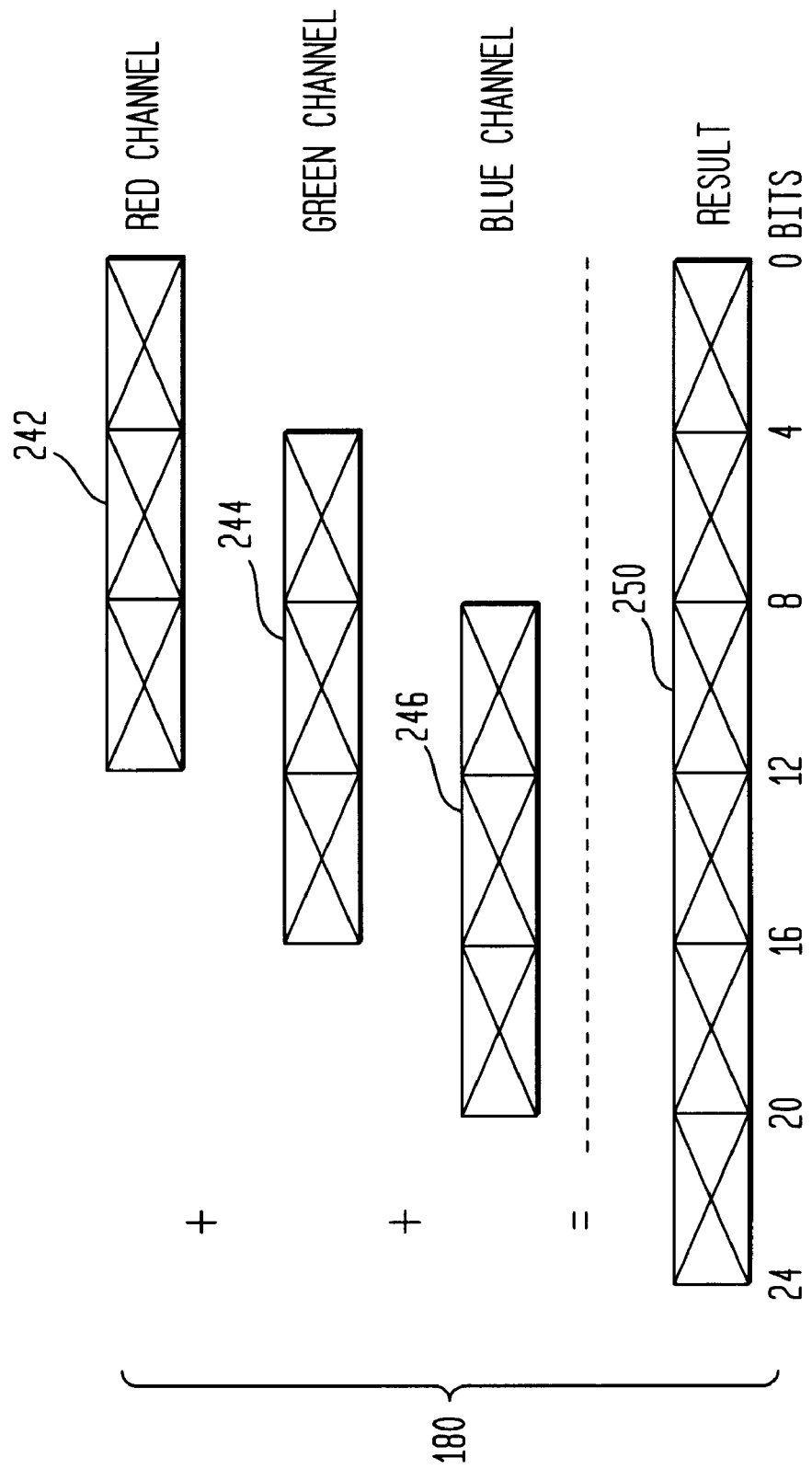

FIGS. 2A and 2B are schematic diagrams of an example interpolation operation that interpolates a first pixel 200 and a second pixel 201 according to the present invention. In most sampling operations, first and second pixels 200 and 201 are adjacent pixels in texture space (also called texels). As shown in FIG. 2A, first pixel 200 and second pixel 201 each have 16 bits. Pixel 200 is comprised of four four-bit data segments 202, 204, 206, and 208. Pixel 201 is comprised of four four-bit data segments 203, 205, 207, and 209. Least significant bits (LSB) are shown on the right and most significant bits (MSB) are shown on the left in FIGS. 2A and 2B.

As described above, in step 120 16-bit pixels 200 and 201 are first separated into respective groups of four-bit data segments in 12-bit multiple texture channels (red, blue, and green). For pixel 200, two data segments 202 and 204 are placed in a twelve bit word 222 in a red texture channel. Data segment 206 is placed in a twelve bit word 224 in a green texture channel. Data segment 208 is placed in a twelve bit word 226 in a blue texture channel. Likewise, for pixel 201 two data segments 203 and 205 are placed in a twelve bit word 223 in a red texture channel. Data segment 207 is placed in a twelve bit word 225 in a green texture channel. Data segment 209 is placed in a twelve bit word 227 in a blue texture channel.

Preferably, data segments 202 and 204 (and data segments 203 and 205) are placed in the lower significant bits of the twelve bit word to keep higher bits available for the interpolated value calculated in step 140. Data segments 206 and 208 (and data segments 207 and 209) are placed in the middle of the twelve bit word to keep higher and lower bits available for the interpolated value calculated in step 140.

In step 140, interpolation is carried out in each texture channel separately using limited precision graphics hardware having a bit precision threshold (12 bits) less than the number of bits in the pixels (16 bits). Thus, in the red channel, the data segments in words 222 and 223 are interpolated to obtain a twelve-bit interpolated value 242. In the green channel, the data segments in words 224 and 225 are interpolated to obtain a twelve-bit interpolated value 244. In the blue channel, the data segments in words 226 and 227 are interpolated to obtain a twelve-bit interpolated value 246. Any type of interpolation operation can be performed. Words 242, 244, and 246 can then be output for storage in a frame buffer as described with respect to step 160.

An accumulation operation, such as, blending, is used to accumulate interpolated pixel values for each texture channel for a number of samples in the frame buffer, as described with respect to step 180. This accumulation process can be divided into two parts: internal and external. An internal accumulation such as blending, can take advantage of available most significant bits in the frame buffer. For example, an internal accumulation operation in the example case can be used to accumulate 16 numbers (each similar to the result of step 140) without an overflow.

In the external accumulation operation as shown in FIG. 2B, 12-bit words 242, 244, and 246 are staggered and combined to form a 24-bit result 250. In particular, word 244 is shifted left four bits relative to word 242, and word 246 is shifted left eight bits relative to word 242. Further accumulation of remaining data can be performed to accumulate data over a number of samples.

Interpolation routine 100 and its constituent steps 120, 140, and 160 can be implemented in software, firmware, hardware, and any combination thereof.

For clarity, the above embodiment and example are described with respect to interpolating pixels. However, as would be apparent to a person skilled in the art given this description, the present invention is not so limited as any type of data can be interpolated using multichannel texture mapping as described herein.

In one preferred example, interpolation according to the present invention is used in computer tomography and volume rendering using texture mapping. Data comprises a sinogram sample of an image. The sinogram sample consists of a single channel of luminance grey-scale data in 16-bit data blocks (or pixels). First and second pixels undergoing bi-linear interpolation each comprise 16-bit data blocks having first to fourth four-bit data segments. The frame buffer stores 12-bit data segments in red, green, blue, and/or alpha texture channels. In one example, first and second data segments are passed into a red texture channel. A third data segment is passed into a green texture channel and a fourth data segment is passed into a blue texture channel.

When lower resolution data is used, e.g. 13 bits, the red, green, and blue channels can be filled such that five MSB bits are left empty and thus accommodate 32 bits of data. This reduces the traffic between a frame-buffer and main memory in machines, such as, Indigo2 and Impact machines manufactured by Silicon Graphics, Inc.

If more than four bits of interpolation are required and at least five bits are needed, sinograms can be first inflated using texture mapping hardware to double their size. The inflated sinograms can be then used in interpolation as described above. Such inflation beforehand will inflate additional bit(s) to the interpolation. Note that theoretically due to cache size problems with some graphics cards (e.g. an Impact graphics card), one-dimensional (1D) texture is preferred. The present invention is not so limited, however, as 1D texture or multi-dimensional texture (2D texture, 3D texture, etc.) can be used.

Figure 2C:
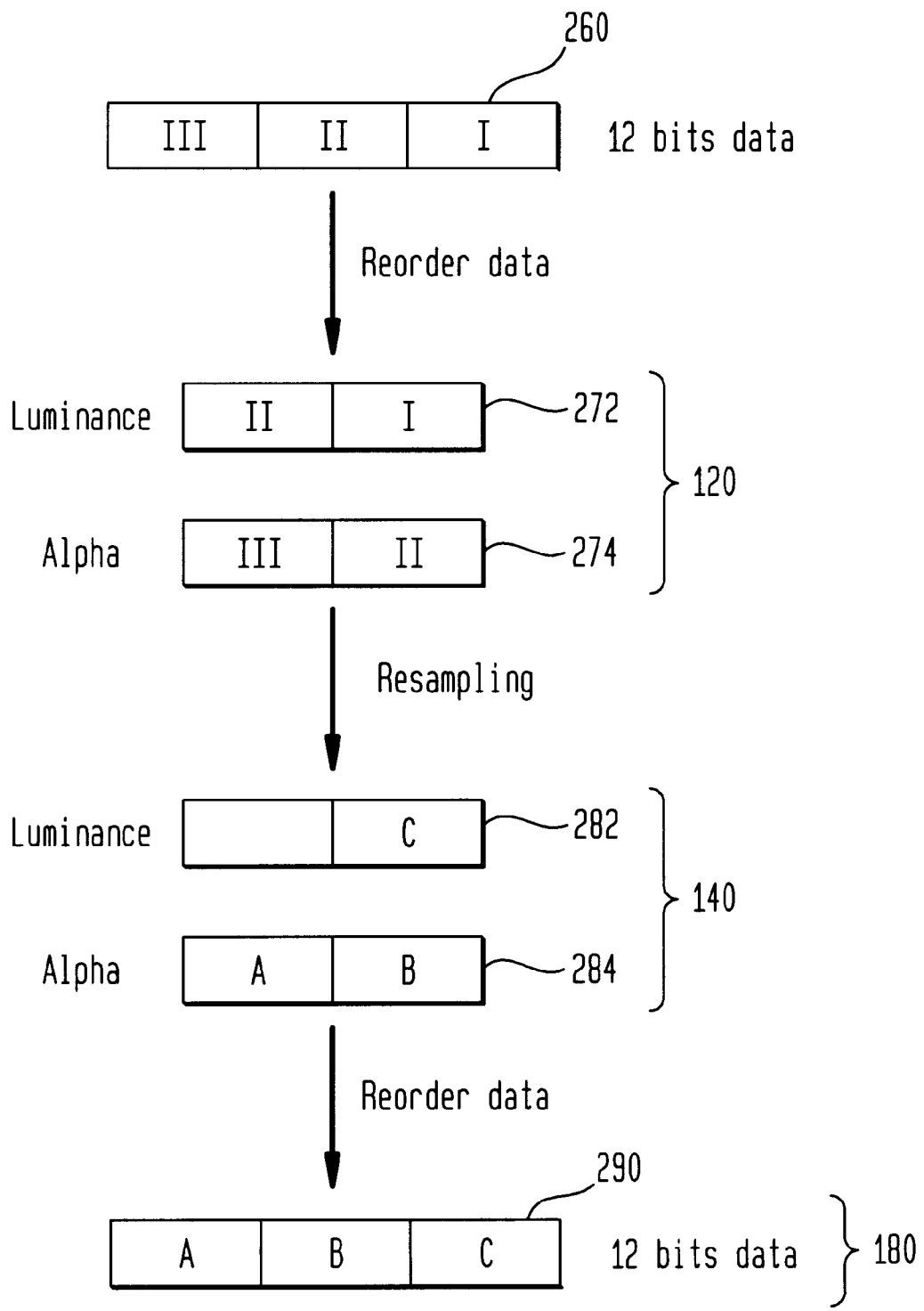
FIG. 2C is a schematic diagram of another example interpolation operation according to the present invention.

In another example of the present invention shown in FIG. 2C, data is sampled from a single channel of luminance grey-scale data in data blocks (e.g., 12-bit blocks or pixels). First and second pixels undergoing bi-linear interpolation each comprise 12-bit data blocks having first to third four-bit data segments (I, II, III). For clarity, only one 12-bit data block or pixel 260 is shown. First and second data segments I and II are passed into an 8-bit word 272 in a luminance texture channel (step 120). Second and third data segments II, III are passed into an 8-bit word 274 in an alpha texture channel (step 120).

In the luminance channel, the data segments I, II in each pixel are interpolated to obtain an eight-bit word 282 including four least significant bits C representing an interpolated value (step 140). In the alpha channel, the data segments II, III in each pixel are interpolated to obtain an eight-bit word 284 having four MSBs A and four LSBs B representing an interpolated value (step 140). Any type of interpolation operation can be performed. A frame buffer can (not shown in FIG. 2C) can store 8-bit words 282, 284 in luminance and alpha texture channels (step 160). The four-bit segments A, B, and C of words 282 and 284 are then reordered and combined to form a 12-bit result 290 (A,B,C) (step 180). In particular, data in words 282 and 284 is reordered to obtain a twelve-bit result word 290 wherein the four least significant bits C of word 282 are the four least significant bits of the twelve-bit result word 290 and the eight bits of word 284 are the eight most significant bits of the twelve-bit result word 290. Further accumulation of remaining data can be performed to accumulate data over a number of samples.

In still another example of the present invention, data is sampled from a single channel of luminance grey-scale data in data blocks (e.g., 12-bit blocks or pixels). First and second pixels undergoing bi-linear interpolation each comprise 12-bit data blocks having first to third four-bit data segments. The frame buffer stores 8-bit data segments in red, green, blue, luminance and/or alpha texture channels. In one example, first and second data segments are passed into a red texture channel. A third data segment is passed into a green texture channel.

Thus, interpolation can be performed in resampling and accumulation with increased precision using multi-channel texture mapping provided in limited-precision graphics hardware. According to the present invention, high-precision pixels having a number of bits greater than a precision bit threshold of the limited-precision graphics hardware can be interpolated (resampled and accumulated) using multi-channel texture mapping provided in limited-precision graphics hardware.

Figure 3:
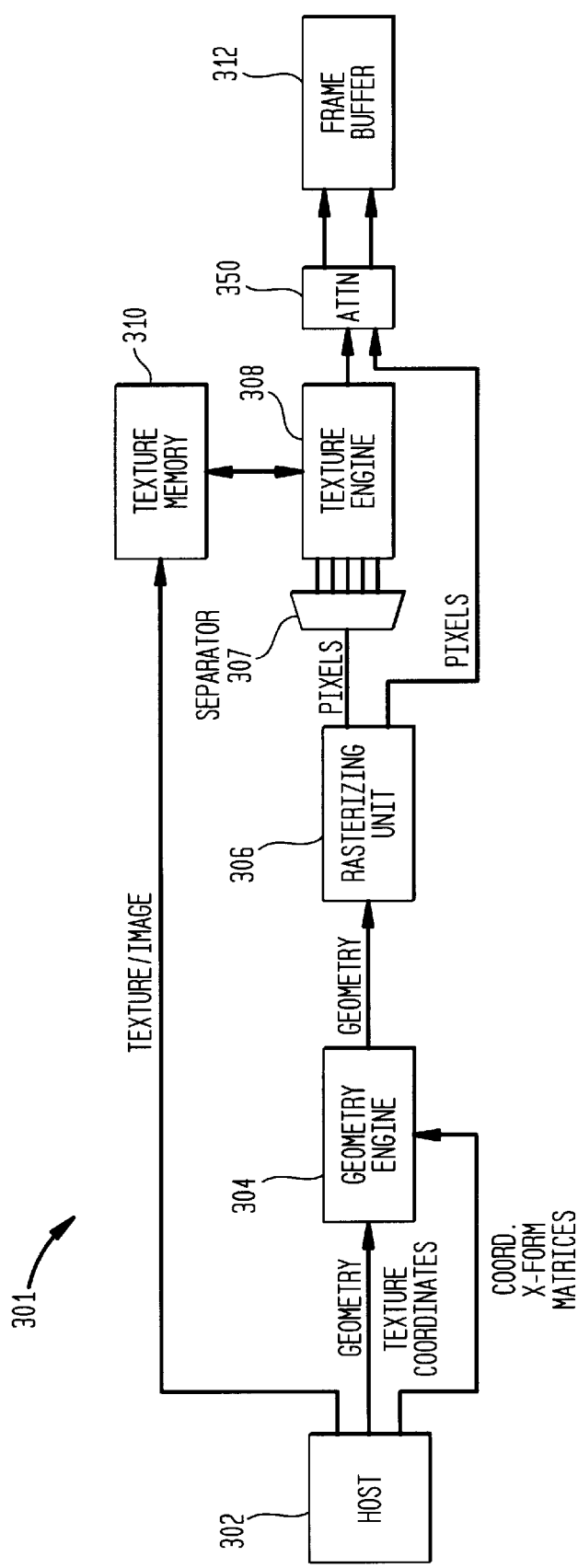
FIG. 3 is a block diagram for supporting interpolation according to one embodiment of the present invention.

FIG. 3 is a block diagram for supporting interpolation in a computer tomography (CT) and imaging system 301 according to one embodiment of the present invention. Computer tomography (CT) and imaging system 301 includes a host computer 302, geometry engine 304, rasterizing unit 306, texture engine 308 texture memory 310, attenuation unit 350, and frame buffer 312. Texture engine 308 is a limited precision multi-texture channel texture engine. Interpolation can be performed in multiple texture channels as part of standard texture mapping operations. The general operation of each of these components is well-known in graphics processing and CT imaging, and described in detail, for example, in the commonly-owned, co-pending U.S. patent application by Cabral and Foran (application Ser. No. 08/499,614), incorporated by reference herein above.

To implement interpolation routine 100, computer tomography (CT) and imaging system 301 further includes a separator unit 307. In one embodiment, separator unit 307 performs step 120 as described above. Steps 140 and 160 are then carried out in texture engine 308 using standard texture interpolation, accumulation, and blending operations.

Steps 120, 140 and 160 can be implemented in software, firmware, and/or hardware in one or more processing components. For example, any host or graphics processor can be used to implement routine 100 in software running on a processor(s). In the example of FIG. 3, host 302 can implement step 120 by controlling pixels passed to separator unit 307. Separator unit 307 can be any type of processing logic (or program code executing on host 307).

Texture engine 308 includes an interpolator unit (not shown) for carrying out step 140 in software, firmware, and/or hardware. An accumulator can be implemented as processing logic (or program code in host 302 or texture engine 308) for performing accumulating and blending operations.

The present invention is described in terms of an example computer graphics processing environment. As described herein, the present invention can be implemented as software, firmware, hardware, or any combination thereof. In general, interpolation according to the present invention can be used for any type of data and is not intended to be limited by the examples described herein. Computer graphics processing using texture mapping is used to perform the interpolation irrespective of whether any further graphics processing or display is needed.

Given the description herein, it would be obvious to one skilled in the art to implement the present invention in any computer graphics application, API, or system that supports a limited precision multi-channel texture engine including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). Any computer graphics architecture that supports a limited precision multi-channel texture engine can be used including, but not limited to, an Open GL™ graphics API architecture (including but not limited to Infinite Reality, Indigo$^2$, Indy, Octane, Onyx, or O$_2$ graphics workstations manufactured by Silicon Graphics, Inc.) and raster graphics architectures such as those described in Foley et al., *Computer Graphics,* Addison-Wesley Publishers, U.S.A. (1996), chapter 18, pp. 855–922 (incorporated herein by reference).

Calculations can be performed in fixed-point or floating point arithmetic. In one implementation, calculations are performed using fixed-point arithmetic (due to the lack of floating-point precision in the frame buffer in current architectures).

Description in these terms is provided for convenience only. It is not intended that the invention be limited to application in this example environment. In fact, after reading the following description, it will become apparent to a person skilled in the relevant art how to implement the invention in alternative environments.

The present invention can be implemented using software running (that is, executing) in an environment similar to that described above. In this document, the term "computer program product" is used to generally refer to a removable storage unit or a hard disk installed in hard disk drive. These computer program products are means for providing software to a computer system (e.g. host 302).

Computer programs (also called computer control logic) are stored in main memory and/or secondary memory. Computer programs can also be received via communications interface. Such computer programs, when executed, enable the computer system to perform the features of the present invention as discussed herein. In particular, the computer programs, when executed, enable a processor to perform the features of the present invention. Accordingly, such computer programs represent controllers of a computer system.

In an embodiment where the invention is implemented using software, the software may be stored in a computer program product and loaded into a computer system using a removable storage drive, hard drive, or communications interface. Alternatively, the computer program product may be downloaded to computer system over a communications path. The control logic (software), when executed by a processor, causes the processor to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for interpolating first and second pixels using multi-channel texture mapping in a texture engine supported by limited-precision graphics hardware, comprising the steps of:

(1) selecting a first channel of data of the first pixel and a second channel of data of the second pixel, each channel of data having a number of bits greater than a precision bit threshold of a texture channel of the texture engine;

(2) separating the first channel of data into a first group of data segments in multiple texture channels, each data segment of the first group of data segments having a number of bits within the precision bit threshold of the texture channel of the texture engine;

(3) separating the second channel of data into a second group of data segments in multiple texture channels each data segment of the second group of data segments having a number of bits within the precision bit threshold of the texture channel of the texture engine; and (4) interpolating the first and second groups of data segments in each texture channel to obtain an interpolated pixel value for each texture channel.

2. The method of claim 1, further comprising the steps of:

(5) repeating steps (1) to (4) for a number of samples; and (6) accumulating interpolated pixel values for each texture channel for the number of samples in a frame buffer.

3. The method of claim 2, wherein step (6) comprises blending interpolated pixel values for each texture channel for the number of samples in the frame buffer.

4. The method of claim 1, wherein the data comprises a sinogram sample of an image, the sinogram sample comprising a single channel of grey-scale data in 16-bit data blocks, the first and second pixels each comprise 16-bit data blocks having first to fourth four-bit data segments, and the frame buffer stores 12-bit data segments in red, green, and blue texture channels; wherein step (2) comprises the steps of, for each 16-bit data block:

passing the first and second data segments into a red texture channel;

passing the third data segment into a green texture channel; and passing the fourth data segment into a blue texture channel.

5. A method for interpolating first and second pixels of a sample drawn from a single channel of data using multi-channel texture mapping in a texture engine supported by limited-precision graphics hardware, the first and second pixels each having a number of bits greater than a precision bit threshold of the limited-precision graphics hardware, comprising the steps of:

(1) separating the first pixel into a first group of data segments in multiple texture channels;

(2) separating the second pixel into a second group of data segments in multiple texture channels; and (3) interpolating the first and second groups of data segments in each texture channel to obtain an interpolated pixel value for each texture channel;

wherein the data comprises a sinogram sample of an image, the sinogram sample comprising a single channel of grey-scale data in 12-bit data blocks, the first and second pixels each comprise 12-bit data blocks having first to third four-bit data segments, and the frame buffer stores 8-bit words in luminance and alpha texture channels;

wherein said (1) separating step comprises the steps of, for each 12-bit data block for the first pixel:

passing the first and second data segments of the first pixel into a first eight-bit word in a luminance texture channel; and passing the second and third data segments of the first pixel into a second eight bit word in an alpha texture channel; and wherein said (2) separating step comprises the steps of, for each 12-bit data block for the second pixel:

passing the first and second data segments of the second pixel into a third eight-bit word in a luminance texture channel; and passing the second and third data segments of the second pixel into a fourth eight-bit word in an alpha texture channel; and wherein said interpolating step (3) comprises the step of interpolating the first and third eight-bit words in the luminance channel to obtain a fifth eight-bit word, and interpolating the second and fourth eight-bit words in the alpha texture channel to obtain a sixth eight-bit word;

further comprising the step of:

reordering data in the fifth and sixth eight-bit words to obtain a twelve-bit result word wherein the four least significant bits of the fifth word are the four least significant bits of the twelve-bit result word and eight bits of the sixth word are the eight most significant bits of the twelve-bit result word.

6. A system for interpolating pixels using multi-channel texture mapping, comprising:

a separator that separates a first channel of data of a first pixel into a first group of data segments in multiple texture channels, said first channel of data having a number of bits greater than a precision bit threshold of a texture channel, and separates a second channel of data of a second pixel into a second group of data segments in multiple texture channels, said second channel of data having a number of bits greater than the precision bit threshold of the texture channel, wherein each data segment of said first and second group of data segments has a number of bits within the precision bit threshold of the texture channel; and an interpolator that interpolates the first and second groups of data segments in each texture channel to obtain an interpolated pixel value for each texture channel.

7. The system of claim 6, further comprising:

an accumulator that sums interpolated pixel values for each texture channel for a number of samples such that a frame buffer can store a cumulative value of the interpolated pixel values for each texture channel for the samples.

8. The system of claim 7, wherein said accumulator comprises a blending unit that performs a blend operation to blend interpolated pixel values for each texture channel for the number of samples.

9. The system of claim 6, wherein the data comprises a sinogram sample of an image, the sinogram sample comprising a single channel of luminance grey-scale data in 16-bit data blocks, the first and second pixels each comprise 16-bit data blocks having first to fourth four-bit data segments, and a frame buffer stores 12-bit data segments in red, green, and blue texture channels; wherein said separator for each 16-bit data block passes the first and second data segments into a red texture channel passes the third data segment into a green texture channel, and passes the fourth data segment into a blue texture channel.

10. A system for interpolating pixels using multi-channel texture mapping comprising:

a separator that separates a first pixel into a first group of data segments in multiple texture channels and separates a second pixel into a second group of data segments in multiple texture channels; and an interpolator that interpolates the first and second groups of data segments in each texture channel to obtain an interpolated pixel value for each texture channel;

wherein the data comprises a sinogram sample of an image, the sinogram sample comprising a single channel of grey-scale data in 12-bit data blocks, the first and second pixels each comprise 12-bit data blocks having first to third four-bit data segments, and a frame buffer stores 8-bit words in luminance and alpha texture channels;

wherein said separator comprises:

means for passing, for each 12-bit data block for the first pixel, the first and second data segments of the first pixel into a first eight-bit word in a luminance texture channel, and the second and third data segments of the first pixel into a second eight bit word in an alpha texture channel; and means for passing, for each 12-bit data block for the second pixel, the first and second data segments of the second pixel into a third eight-bit word in a luminance texture channel, and the second and third data segments of the second pixel into a fourth eight-bit word in an alpha texture channel; and wherein said interpolator comprises:

means for interpolating the first and third eight-bit words in the luminance channel to obtain a fifth eight-bit word; and means for interpolating the second and fourth eight-bit words in the alpha texture channel to obtain a sixth eight-bit word; and further comprising:

means for reordering data in the fifth and sixth eight-bit words to obtain a twelve-bit result word wherein the four least significant bits of the fifth word are the four least significant bits of the twelve-bit result word and eight bits of the sixth word are the eight most significant bits of the twelve-bit result word.

11. The system of claim 6, further comprising:

a texture engine that performs multi-channel texture mapping using limited-precision graphics hardware; said texture engine including said separator and said interpolator.

12. A graphics processing system for interpolating first and second pixels using multi-channel texture mapping in a texture engine supported by limited-precision graphics hardware, comprising:

(1) means for separating a first channel of data of a first pixel into a first group of data segments in multiple texture channels, wherein said first channel of data has a number of bits greater than a precision bit threshold of a texture channel and wherein each data segment of said first group of data segments has a number of bits within the precision bit threshold of the texture channel;

(2) means for separating a second channel of data of a second pixel into a second group of data segments in multiple texture channels, wherein said second channel of data has a number of bits greater than the precision bit threshold of the texture channel and wherein each data segment of said first group of data segments has a number of bits within the precision bit threshold of the texture channel; and (3) means for interpolating the first and second groups of data segments in each texture channel to obtain an interpolated pixel value for each texture channel.

13. The system of claim 12, further comprising:

means for accumulating interpolated pixel values for each texture channel for a number of samples.

14. The system of claim 13, wherein said accumulating means comprises means for blending interpolated pixel values for each texture channel for the number of samples.

15. The system of claim 12, wherein the data comprises a sinogram sample of an image, the sinogram sample comprising a single channel of luminance grey-scale data in 16-bit data blocks, the first and second pixels each comprise 16-bit data blocks having first to fourth four-bit data segments, and said frame buffer stores 12-bit data segments in red, green, and blue texture channels; wherein said separating means comprises:

means for passing the first and second data segments into a red texture channel;

means for passing the third data segment into a green texture channel; and means for passing the fourth data segment into a blue texture channel.

16. A graphics processing system for interpolating first and second pixels of a sample drawn from a single channel of data using multi-channel texture mapping in a texture engine supported by limited-precision graphics hardware, the first and second pixels each having a number of bits greater than a precision bit threshold of the limited-precision graphics hardware comprising:

(1) means for separating the first pixel into a first group of data segments in multiple texture channels;

(2) means for separating the second pixel into a second group of data segments in multiple texture channels; and (3) means for interpolating the first and second groups of data segments in each texture channel to obtain an interpolated pixel value for each texture channel;

wherein the data comprises a sinogram sample of an image, the sinogram sample comprising a single channel of luminance grey-scale data in 12-bit data blocks, the first and second pixels each comprise 12-bit data blocks having first to third four-bit data segments, and a frame buffer stores 8-bit data segments in luminance and alpha texture channels; wherein said separating means comprises:

means for passing the first and second data segments into a luminance texture channel; and means for passing the second and third data segments into an alpha texture channel.

17. A method for interpolating high-precision data words using a limited-precision multi-channel texture engine, comprising the steps of:

(1) separating each high-precision data word into data segments in multiple texture channels, each data segment having a number of bits within a precision bit threshold of a texture channel; and (2) interpolating the data segments in each texture channel to obtain an interpolated sample value for each texture channel.

18. The method of claim 17, further comprising the steps of:

repeating steps (1) to (2) for a number of samples; and accumulating interpolated sample values for each texture channel in a frame buffer.

19. A computer program product comprising a computer useable medium having computer program logic recorded thereon for enabling a graphics processor in a computer system to provide high-precision interpolation using limited-precision multi-channel texture mapping graphics hardware, said computer program logic comprising:

a procedure that enables the graphics processor to separate a first channel of data of a first pixel into a first group of data segments in multiple texture channels, wherein said first channel of data has a number of bits greater than a precision bit threshold of a texture channel of said limited-precision multi-channel texture mapping graphics hardware and wherein each data segment of said first group of data segments has a number of bits within the precision bit threshold of the texture channel, and to separate a second channel of data of a second pixel into a second group of data segments in multiple texture channels, wherein said second channel of data has a number of bits greater than the precision bit threshold of the texture channel of said limited-precision multi-channel texture mapping graphics hardware and wherein each data segment of said second group of data segments has a number of bits within the precision bit threshold of the texture channel; and a procedure that enables the graphics processor to interpolate the first and second groups of data segments in each texture channel to obtain an interpolated pixel value for each texture channel; and a procedure that enables the graphics processor to output the interpolated pixel value for each texture channel for the sample for storage in a frame buffer.

20. A graphics processing system for interpolating first and second pixels using multi-channel texture mapping in a texture engine supported by limited-precision graphics hardware, comprising:

(1) a module that separates a first channel of data of a first pixel into a first group of data segments in multiple texture channels, wherein said first channel of data has a number of bits greater than a precision bit threshold of a texture channel of said limited-precision graphics hardware and wherein each data segment of said first group of data segments has a number of bits within the precision bit threshold of the texture channel;

(2) a module that separates a second channel of data of a second pixel into a second group of data segments in multiple texture channels, wherein said second channel of data has a number of bits greater than the precision bit threshold of the texture channel of said limited-precision graphics hardware and wherein each data segment of said second group of data segments has a number of bits within the precision bit threshold of the texture channel; and (3) a module that interpolates the first and second groups of data segments in each texture channel to obtain an interpolated pixel value for each texture channel.

* * * * *